United States Patent Office 3,511,513
Patented May 12, 1970

1

3,511,513
COMBINATION AXIAL-MECHANICAL FACE
AND RADIAL LIP SEAL
John Charles Dahlheimer, Laconia, N.H., assignor to International Packings Corporation, Bristol, N.H., a corporation of New Hampshire
Filed Jan. 12, 1968, Ser. No. 697,439
Int. Cl. F16j 15/34
U.S. Cl. 277—82                                    11 Claims

ABSTRACT OF THE DISCLOSURE

A combination axial-mechanical face and radial lip seal for a shaft rotating in a bearing race comprising a seal seat fixed to the shaft, a nonrotatable seal washer forming an axial-mechanical seal with the seat, the seal washer having a groove in its outer surface to seat an O-ring and being urged against the seat by a wave spring, and an elastomeric element supported by a reinforcing member with a radial portion urged by the spring against bearing race, the radial portion having a flange in sealing engagement with a groove in the bearing race, one sealing rib radially outward of the flange in sealing engagement with the bearing race, another sealing rib in sealing engagement with the housing bore, and a lip seal engaging the shaft, and an axial portion including a radial flange axially outward of a portion of the seal washer to limit its axial movement from which extend ribs that correspond to axial grooves on the inner surface of the seal washer to prevent its relative rotation. At the terminus of the ribs, formed integrally therewith, is an annular antibottoming shoulder.

Figure 1:
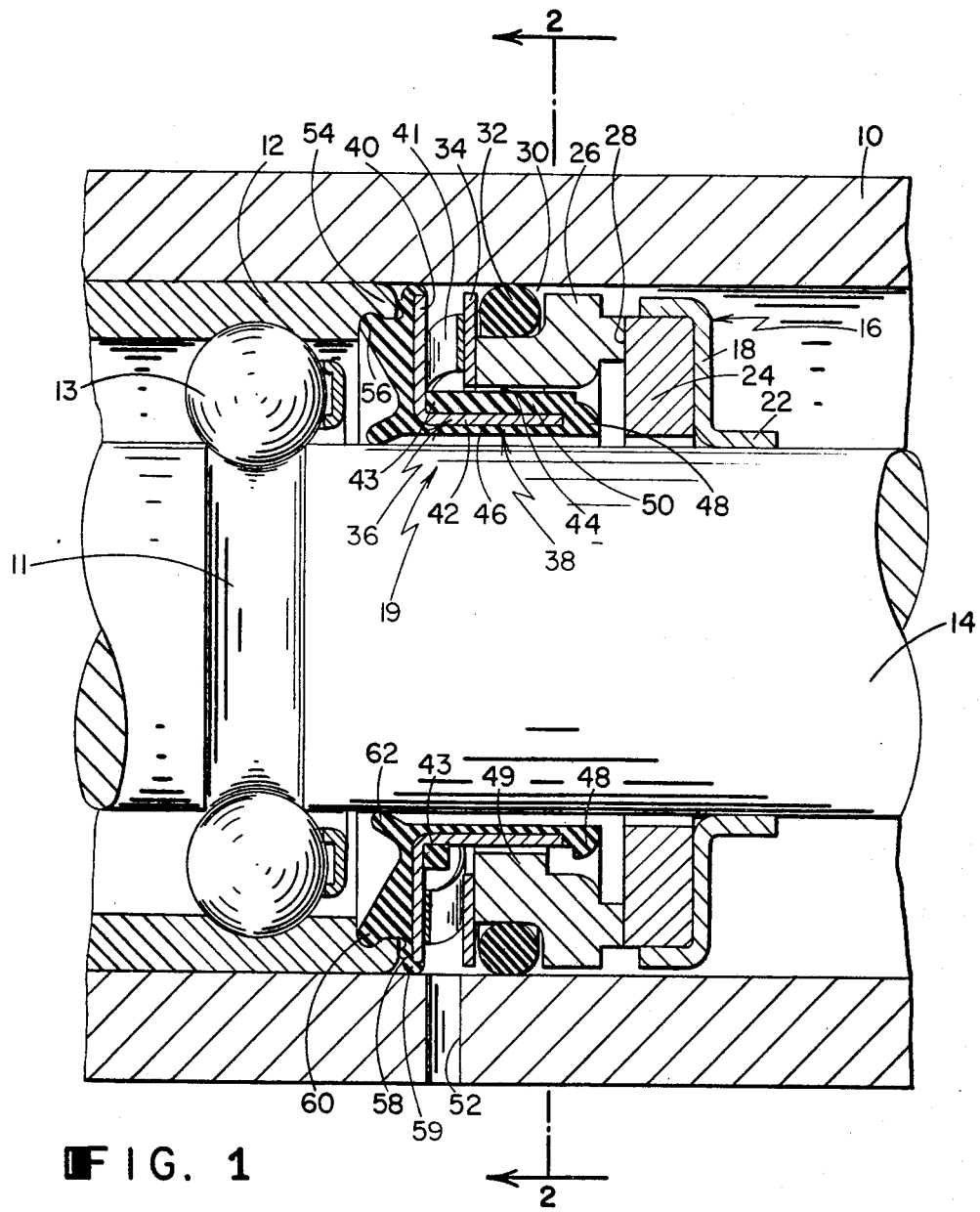

This invention relates to combination mechanical face and radial lip sealing units and more particularly to such sealing units which may be installed into bearing raceways and thus become integral parts of the bearing assemblies.

A frequent problem in bearing applications is to utilize an economical and yet reliable method of sealing bearing lubricant inside a bearing and at the same time exclude harmful fluids under pressure such as water, in a water pump application, from the bearing area. A common answer to the problem has been to use two separate seals, an elastomeric radial seal, usually installed in an integral part of the bearing, to contain the lubricant inside the bearing, and an axial-mechanical face seal, usually installed separately and a distance from the bearing, to exclude harmful fluids under pressure from entering the bearing area.

In addition to retaining the bearing lubricant within the bearing, the elastomeric radial lip seal also served to exclude any slight leakage past the axial-mechanical face seal from entering the bearing area. A drain hole was usually provided between the two seats to drain off any such migratory leakage.

It is an object of this invention to provide a combined axial-mechanical face and radial lip sealing unit whose construction allows the area between the sealing face of the axal-mechanical face seal and the radial line of contact of the radial lip seal to be vented externally of the sealed area.

Another object of this invention is to provide a combination axial-mechanical face and radial lip sealing unit which has a rigid flange of a partially elastomeric construction which may be snapped into and against the raceway of the bearing, providing a leakproof and static junction between the sealing unit and bearing race, and at the same time causing the sealing unit to become an integral part of the bearing assembly.

It is a further object of this invention to provide a combination axial-mechanical face and radial lip sealing unit which can be assembled by a seal manufacturer and shipped to a bearing manufacturer as a unitized assembly.

A still further object of this invention is to provide a combination axial-mechanical face and radial lip sealing unit having an elastomeric molded unitizing flange, antibottoming shoulder, as well as a molded radial sealing lip and static sealing flange.

It is another object of this invention to provide a combination axial-mechanical face and radial lip sealing unit of few parts, small in radial cross section and low in cost.

The invention features a combination axial-mechanical face and radial lip seal for sealing a shaft rotatable with respect to a surrounding member. It includes a seal seat fixed to the shaft, a radial lip sealing elastomeric element adjacent the surrounding member, a reinforcing member to which the lip element is bonded, an axial-mechanical sealing element mounted around the shaft for relative axial movement and sealing engagement with the seal seat and spring means performing the three functions of urging the sealing elements apart, urging the radial lip sealing element toward the surrounding member and urging the axial-mechanical sealing element toward the seal seat. A portion of the lip sealing element communicates with the axial-mechanical element to prevent its rotation relative to the lip element while permitting axial movement. In preferred embodiments, the surrounding member defines an annular groove in which an annular flange of the lip sealing element is in sealing engagement and the lip sealing member includes at least one annular sealing rib radially outward of the flange for sealing engagement with the surrounding member. Preferably, too, the axial-mechanical sealing element is annular and has at least one axial groove on its inner surface and the communicating portion of the lip sealing element is cylindrical and extends inside and past the axial-mechanical element, terminating in a radially outwardly extending flange with an outside diameter greater than the inside diameter of the axial-mechanical element to limit its axial movement. Lugs extending axially from the radially outwardly extending flange enter the axial-mechanical element's axial grooves to prevent its rotation relative to the lip element. An annular antibottoming shoulder is included, integral with the lugs and between the axial-mechanical sealing element and reinforcing member.

Figure 2:
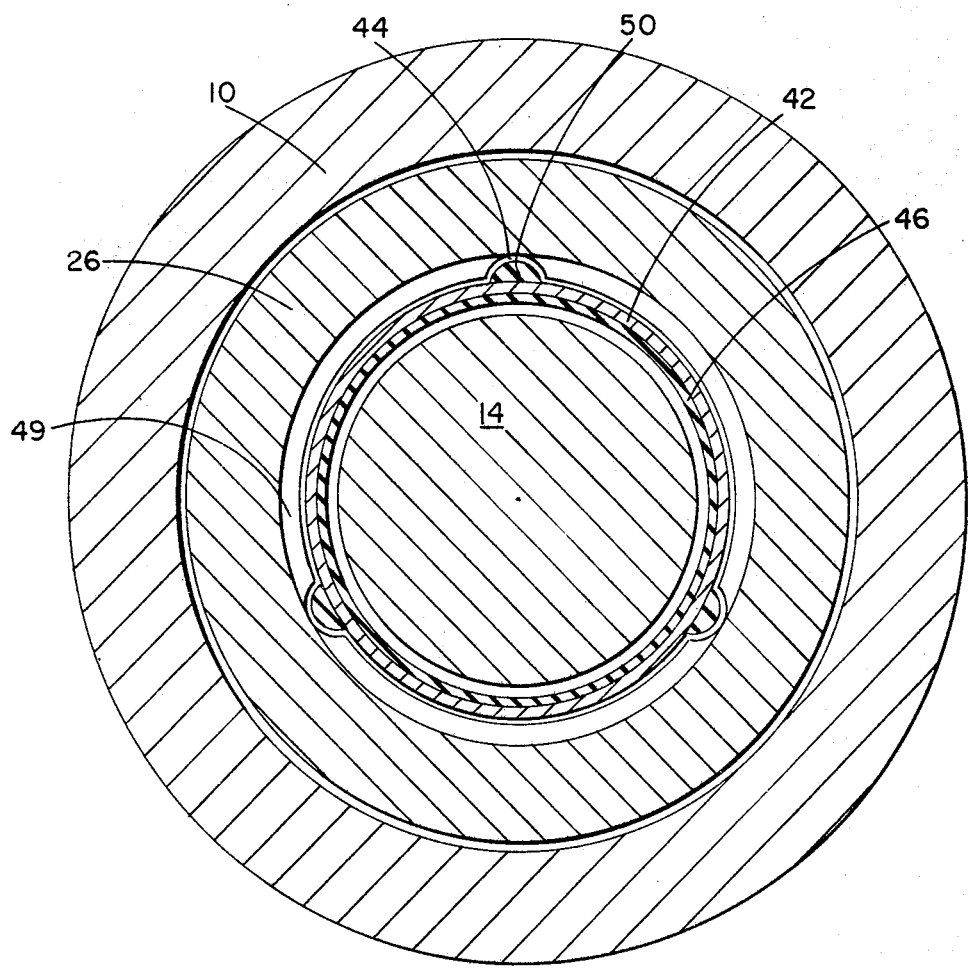

Other objects and advantages will be apparent, and the invention more fully understood by reference to the following description, taken together with the accompanying drawings of an illustrative embodiment of the invention in which FIG. 1 is a cross-sectional view of the sealing unit of this invention mounted in a water pump; and FIG. 2 is a view of the seal taken along line 2—2 of FIG. 1.

Referring to the drawings, in FIGS. 1 and 2 is shown a housing 10 through which a shaft 14 extends, the latter being supported within the former by ball bearings 13 operating in a groove 11 in shaft 14 and a grooved bearing outer race 12 mounted within housing 10. The bearing outer race 12 has an annular portion 54 extending radially inwardly and axially outwardly forming a retaining groove 56.

The novel combination axial-mechanical face and radial lip seal of the invention is interposed between shaft 14 and housing 10. In general, it includes a rotating face seal seat assembly, generally designated 16, fixed to shaft 14 for rotation therewith, cooperating with a rotatably fixed face seal washer assembly 26 mounted for axial movement on a rotatively fixed radial lip seal assembly, generally designated 19, positioned between face seal seat assembly 16 and ball bearings 13 for preventing unwanted fluid access thereto. The lip seal assembly 19 not only seals aginst housing 10, but also provides a secondary dynamic seal aginst shaft 14 for any leakge past the primary face seal elements. For draining any such leakage, a drain hole 52 is provided through housing 10 between the secondary and primary seals.

More specifically, rotating face seal seat assembly 16 includes an annular retaining shell 18 mounted on shaft 14 which retains ring-like face seal seat element 24. Retaining shell 18 has a radial wall, a flange extending axially inwardly from the outer edge of the wall, and a flange 22 extending axially outwardly from the inner edge of the wall, the latter being press-fitted to the shaft 14. The ring-like face seal seat 24, made of ceramic or other suitable material as known to the art to provide a smooth and flat axially inward radial sealing surface, fits into the recess formed by the retaining shell 18 and is retained therein by suitable means.

The cooperating nonrotating annular face seal washer 26 made of carbon-graphite or the like, and providing a suitable flat smooth sealing surface 28, is mounted axially inward of the seal seat 24 between it and ball bearings 13 to form the primary axial mechanical face seal. An annular recess 30 in the outer surface of seal washer 26 forms a seat for an O-ring 32 of elastomeric material providing a fluid seal between washer 26 and housing 10. Inwardly extending portion 49 of the washer, with three axial grooves 44 (FIG. 2) provided in its inside surface equally spaced about the circumference, is provided with an axially inner flat radial face against which abuts flat metal washer 34. A wave spring 41 is located axially inward of washer 34, interposed between it and radial lip seal assembly 38 to provide the necessary pressure for the face seal elements.

Radial lip seal assembly 19 includes an L-shaped annular metal reinforcing member 36 supporting an elastomeric seal element, generally designated 38. Reinforcing member 36 has a radial wall 40 axially inwardly spaced from flat washer 34, with wave spring 41 located therebetween. An axial wall 42 of the reinforcing member extends outwardly from the inner edge of the radial wall inside flat washer 34 and seal washer 26. An annular antibottoming shoulder 43, part of elastomeric member 38, is located at the inside junction of the walls of the reinforcing member.

In order to limit axial movement of face seal washer 26 with respect to the elastomeric element 38, the elastomeric element has an annular axial portion 46 which lies radially inwardly of reinforcing member axial wall 42 and terminates in a radially outwardly extending flange 48 located axially outward of both axial wall 42 of the reinforcing member and the radially inwardly extending portion 49 of the seal washer. It acts as an axial stop for face seal washer 26 since the outer diameter of flange 48 is greater than the inner diameter of portion 49 of seal washer 26. Also, as best seen in FIG. 2, at locations corresponding to seal washer grooves 44, portions of elastomeric element 38 extend axially inwardly from the outer edge of flange 48 to form three lugs 50 cooperating with the seal washer grooves to prevent rotation thereof relative to radial lip seal assemble 19.

In order to provide the necessary fluid seal between it and housing 10, the portion of the elastomeric element 38 located axially inward of reinforcing element 36 includes one annular sealing rib 58 which extends to meet, in sealing engagement therewith, the radial face of bearing race portion 54 and another annular sealing rib 59 which sealingly engages the surface of the core of the housing 10. When engineering considerations dictate, one or the other of the sealing ribs may be omitted. A sealing flange 60 also extends from the main portion of the elastomeric element 38 and fits tightly in sealing engagement in bearing race groove 56. The secondary dynamic seal for shaft 14 is provided by annular sealing lip 62 which extends from the elastomeric element into sealing contact with shaft 14.

Many of the components of the seal are held together by elastomeric element 38 bonded to reinforcing member 36. The unitizing flange 48 holds in place sealing snaps into groove 56 in bearing race 12. Sealing flange 60 provides a leak proof and static junction between the sealing unit and the bearing race and at the same time causes the sealing unit to become an integral part of the bearing assembly.

Other static seals are provided by sealing rib 58 in conjunction with bearing outer race 12, and sealing rib 59 in conjunction with the core or housing 10. Sealing lip 62 provides a dynamic seal both against bearing lubricant on one side and any slight leakage or "weepage," past the axial mechanical face seal on the other. Any leakage may be drained off through drain hole 52 in the housing 10.

On the other side, sealing against the advance of harmful liquids into the bearings is accomplished by the mechanical face dynamic seal formed by the meeting of seal seat 24 and flange 28 of seal washer 26, and the static seal provided by O-ring 32.

Wave spring 41 helps maintain a good seal by urging face seal washer 26 toward seal seat 24 and sealing rib 58 and sealing flange 60 toward the bearing outer race 12. Antibottoming shoulder 43 prevents reinforcing member wall 40 and flat washer 34 from coming together and flattening spring 41.

Antirotational lugs 50 prevent rotation of seal washer 26 while allowing axial movement of the washer.

Axial movement of the washer is limited by the presence of flange 48 of the elastomeric element.

Other embodiments will occur to those skilled in the art and are within the following claims.

What is claimed is:

1. A combination axial-mechanical face and radial lip seal for sealing a shaft member rotatable with respect to a surrounding member, including, a seal seat fixed rotationally with respect to one of said members, said seal seat being in effective static sealing relationship with said one member to define a first static seal, an axial-mechanical sealing element fixed rotationally with respect to the other of said members and mounted for axial movement and sealing engagement with respect to said seat, said axial-mechanical sealing element and said seat defining a first effective dynamic seal between said shaft member and said surrounding member, a radial lip sealing elastomeric element having a portion communicating with said axial-mechanical sealing element to prevent relative rotation of said elements, said radial lip sealing element being in effective static sealing relationship with said other member to define a second static seal, and spring means interposed between said sealing elements, urging said axial-mechanical sealing element toward said seat, said radial lip sealing element including an elastomeric lip disposed in contact with said one member to form a second dynamic seal therewith.

2. A seal as claimed in claim 1 further comprising a reinforcing member bonded to said radial lip sealing element.

3. A seal as claimed in claim 1 wherein said radial lip sealing member has a static sealing lip in sealing contact with said other member.

4. A seal as claimed in claim 1 in which said surrounding member defines an annular groove and said radial lip sealing element includes an annular flange for sealing engagement in said surrounding member groove.

5. A seal as claimed in claim 4 in which said radial lip sealing element includes at least one annular sealing rib for sealing engagement with said surrounding member.

6. A seal as claimed in claim 5 wherein said sealing rib is radially outward of said flange.

7. A seal as claimed in claim 2 wherein said axial-mechanical sealing element is annular and has at least one axial groove on its radially inner surface and said radial lip sealing element communicating portion includes corresponding lugs to enter said grooves to prevent rotation of said axial-mechanical sealing element relative to said radial lip sealing element.

8. A seal as claimed in claim 7 including an annular antibottoming shoulder integral with said lugs, said shoulder being located between said axial-mechanical sealing element and said reinforcing member.

9. A seal as claimed in claim 1 wherein said axial-mechanical sealing element is annular and said radial lip sealing element portion is cylindrical and extends inside and past said axial-mechanical sealing element, terminating in a radially outwardly extending flange with an outside diameter greater than the inside diameter of said axial-mechanical sealing element to limit the axial movement of said axial-mechanical sealing element.

10. A seal as claimed in claim 9 wherein said axail-mechanical sealing element has at least one axial groove on its radially inner surface and corresponding lugs extend from said radial element portion flange to enter said grooves to prevent rotation of said axial-mechanical sealing element relative to said radial lip sealing element.

11. A combination axial-mechanical face and radial lip seal for sealing a shaft rotatable with respect to a surrounding member defining an annular groove, including
a seal seat fixed to said shaft;
a radial lip sealing elastomeric element adjacent said surrounding member;
a reinforcing member;
said lip element being bonded to said reinforcing member; and
an annular axial-mechanical sealing element mounted around said shaft for relative axial movement and sealing engagement with said seal seat and having at least one axial groove on its radially inner surface;
said radial lip sealing element including
an annular flange for sealing engagement in said surrounding member groove;
at least one annular sealing rib radially outward of said rigid flange for sealing engagement with said surrounding member groove;
an annular portion extending inside and past said axial-mechanical sealing element, terminating in a radially outwardly extending flange with an outside diameter greater than the inside diameter of said axial-mechanical sealing element to limit the axial movement of said axial-mechanical element, and
lugs extending from said radially outwardly extending flange within said axial grooves to prevent rotation of said axial-mechanical sealing element relative to said radial lip sealing element.

References Cited

UNITED STATES PATENTS

| | | | |
|---|---|---|---|
| 2,479,968 | 8/1949 | Shick | 277—38 |
| 2,554,406 | 5/1951 | Hastings et al. | 277—38 |
| 2,797,940 | 7/1957 | Michener et al. | 277—91 |
| 2,830,858 | 4/1958 | Moorman et al. | 277—153 X |
| 2,833,577 | 5/1958 | Reynolds | 277—153 X |
| 2,859,988 | 11/1958 | Payne | 277—85 |
| 3,109,660 | 11/1963 | Wahl et al. | 277—38 |
| 3,152,808 | 10/1964 | Tankus et al. | 277—87 X |
| 3,181,874 | 5/1965 | Conklin | 277—86 |
| 3,031,199 | 4/1962 | Laser et al. | 277—86 |

JAMES KEE CHI, Primary Examiner

U.S. Cl. X.R.
277—38, 86, 65, 153